United States Patent
Popescu et al.

(10) Patent No.: US 9,825,689 B2
(45) Date of Patent: Nov. 21, 2017

(54) UNIFIED DEVICE FOR ADJACENT AND NON-ADJACENT CHANNELS FOR PROCESSING PHYSICAL LAYER PROTOCOL DATA UNITS

(71) Applicant: Samsung Electronics Co., Ltd., Gyeonggi-do (KR)

(72) Inventors: Andrei Popescu, Cambridge (GB); Fei Tong, Bassingbourn (GB)

(73) Assignee: Samsung Electronics Co., Ltd (KR)

( * ) Notice: Subject to any disclaimer, the term of this patent is extended or adjusted under 35 U.S.C. 154(b) by 303 days.

(21) Appl. No.: 14/088,000

(22) Filed: Nov. 22, 2013

(65) Prior Publication Data

US 2015/0043555 A1 Feb. 12, 2015

Related U.S. Application Data

(60) Provisional application No. 61/864,952, filed on Aug. 12, 2013.

(51) Int. Cl.
*H04B 7/06* (2006.01)
*H04B 7/08* (2006.01)
*H04B 7/04* (2006.01)

(52) U.S. Cl.
CPC ......... *H04B 7/0871* (2013.01); *H04B 7/0689* (2013.01)

(58) Field of Classification Search
CPC ... H04B 7/0697; H04B 7/0413; H04B 7/0805
See application file for complete search history.

(56) References Cited

U.S. PATENT DOCUMENTS

| | | | | |
|---|---|---|---|---|
| 4,797,639 | A * | 1/1989 | Driscoll | H03B 5/32 331/158 |
| 8,219,878 | B1 * | 7/2012 | Varnica | H03M 13/1111 714/758 |
| 8,699,985 | B1 * | 4/2014 | Mar | G06F 1/0328 455/209 |
| 2001/0029596 | A1 * | 10/2001 | Kim | H03M 13/25 714/796 |
| 2003/0190900 | A1 * | 10/2003 | Yasuda | H04B 1/005 455/265 |
| 2006/0252386 | A1 * | 11/2006 | Boer | H04B 7/0413 455/101 |
| 2008/0192855 | A1 * | 8/2008 | Shapira | G01S 3/023 375/267 |
| 2011/0019785 | A1 * | 1/2011 | Cowley | H04B 17/11 375/350 |
| 2014/0179251 | A1 * | 6/2014 | Persico | H03G 3/3078 455/226.2 |
| 2014/0355526 | A1 * | 12/2014 | Kahrizi | H04L 5/00 370/329 |

* cited by examiner

*Primary Examiner* — Charles C Jiang
*Assistant Examiner* — Thad Defauw
(74) *Attorney, Agent, or Firm* — The Farrell Law Firm, P.C.

(57) ABSTRACT

A unified device for adjacent and non-adjacent channels/carriers for processing Physical layer Protocol Data Units (PPDUs) includes a dual-use configuration capable of processing either 80+80 Megahertz (MHz) PPDUs with a single spatial stream (160/80+80 MHz 1×1) or 80 MHz PPDUs with two spatial streams (80 MHz 2×2).

20 Claims, 9 Drawing Sheets ced by LO1 in the single LO structure 300 in FIG. 3.

UNIFIED DEVICE FOR ADJACENT AND NON-ADJACENT CHANNELS FOR PROCESSING PHYSICAL LAYER PROTOCOL DATA UNITS

PRIORITY

This application claims priority under 35 U.S.C. §119(e) to U.S. Provisional Application Ser. No. 61/864,952, which was filed in the U.S. Patent and Trademark Office on Aug. 12, 2013, the contents of which are incorporated herein by reference.

BACKGROUND OF THE INVENTION

1. Field of the Invention

The present invention relates generally to a unified device for adjacent and non-adjacent channels/carriers for transmitting and receiving Physical layer Protocol Data Units (PPDUs), and more particularly, to a dual-use device capable of processing either 80+80 Megahertz (MHz) PPDUs with a single spatial stream (160/80+80 MHz 1×1) or 80 MHz PPDUs with two spatial streams (80 MHz 2×2).

2. Description of the Related Art

The IEEE 802.11ac standard (the 'Standard') builds on the Multiple Input Multiple Output (MIMO) techniques introduced in the IEEE 802.11n standard (which is hereby incorporated by reference in its entirety), and specifies transmission of wide-band 80 MHz and 160 MHz bandwidth modulations. The 160 MHz transmissions occupy two 80 MHz channels that may be adjacent in frequency, in which case they are called 160 MHz transmissions or PPDUs, or non-adjacent in the case of '80+80 MHz PPDUs'.

Conventionally, the sub-carrier allocation is specified for 160 MHz channels so that it matches exactly that of two adjacent 80 MHz channels (i.e. with their center frequencies separated by 80 MHz), thus allowing the two 80 MHz parts of a 160 MHz or 80+80 MHz PPDU to be transmitted or received using two separate 80 MHz transceivers.

FIG. 1 illustrates a 2-antenna 80+80 MHz structure operating in a 2×2 MIMO configuration, to which the present invention is applied. In FIG. 1, the structure 100 includes a WiFi modem chip 110 incorporating a space-time stream #1 120 and a space-time stream #2 130 connected to two front-end circuits 160 and 170, respectively, through respective buffers 140 and 150. Specifically, for each space-time stream, a Transmission (Tx) Radio Frequency (RF) port enters the buffer and exits to the front-end circuit, and a Reception (Rx) RF port is received directly from each of the front-end circuits, which are connected to antennas 180. In FIG. 1, one oscillator is used to transmit or receive the 80+80 MHz modulation, as shown in FIG. 2, as both front-end circuits 160 and 170 operate on the same frequency.

Specifically, FIG. 2 illustrates a dual Local Oscillator (LO) structure for the 2-antenna 80+80 MHz structure illustrated in FIG. 1. The LO structure 200 in FIG. 2 includes two oscillators LO1 and LO2, which are connected in the space-time streams #1 and #2 in FIG. 1, respectively. The signal from LO1 is fed to a first Mixer (M1), where it is combined with the upper input stream and is output. Similarly, the signal from LO2 is fed to a second Mixer (M2), where it is combined with the lower input stream and is output.

As an alternative for the embodiment of FIGS. 1 and 2, the conventional art also teaches the use of one LO, as illustrated by LO1 in the single LO structure 300 in FIG. 3. The signal from LO1 is fed to both M1 and M2, where it is combined with the upper and lower input streams, respectively, and is output. The embodiment of FIG. 3, in which one oscillator drives both transceivers, has been proposed to mitigate possible interference between the two oscillators in the embodiment of FIG. 2.

However, the use of the two oscillators in the conventional art, in the manner of FIG. 2, causes switching difficulties when applying the signal to the two transceivers. In addition, users tend to possess a plurality of mobile units operating in various frequencies, yet the conventional art is deficient in providing one structure to accommodate a user's needs to operate in either frequency/spatial multiplexing configuration, and to reuse the same device in the various mobile units that the user may possess, through reconfiguration.

Accordingly, there is a need in the art for a reusable, unified device capable of processing either 80+80 Megahertz (MHz) PPDUs with a single spatial stream (160/80+80 MHz 1×1) or 80 MHz PPDUs with two spatial streams (80 MHz 2×2).

SUMMARY OF THE INVENTION

Accordingly, the present invention is designed to address at least the problems and/or disadvantages described above and to provide at least the advantages described below.

According to an aspect of the present invention, a unified device for processing adjacent and non-adjacent PPDUs includes two antennas, two local oscillators electrically connected to the two antennas, respectively, and a multiplexer configured to be electrically connected to either of the local oscillators, based on switching.

According to an aspect of the present invention, a method for transmitting or receiving a spatial multiplexed signal in a unified structure in a mobile terminal, includes transmitting or receiving signals, by two local oscillators electrically connected to two antennas, respectively, and receiving, by a multiplexer configured to be electrically connected to either of the local oscillators based on switching, the frequency signals from a selected one of the local oscillators.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for the sake of clarity and conciseness.

Herein, the term "unified" generally refers to the merging, on one device, of a 2-antenna, 2×2 80 MHz structure with a one-antenna, 1×1 160 MHz or 80+80 MHz structure, thereby providing a dual-use device. The term "reconfigure" generally refers to the ability to switch the device to operate in either mode, as selected.

160 MHz or 80+80 MHz PPDUs are a good fit for single-antenna devices, where they provide increased throughput by using a wide bandwidth. However, most of the processing blocks used for the two frequency segments when transmitting or receiving 80+80 or 160 MHz PPDUs can be reused for transmitting or receiving the spatial streams of a two-spatial-stream (2SS) 80 MHz modulation. Considering this, the present invention discloses a dual-use device, capable of either 80+80/160 MHz operation or of MIMO operation with two spatial streams (2×2 MIMO operation).

Embodiments of the present invention provide an efficient, dual-use device capable of processing either 1) 80+80 MHz PPDUs with a single spatial stream (160/80+80 MHz 1×1) or 2) 80 MHz PPDUs with two spatial streams (80 MHz 2×2 case). With this device, the external connection to the PHYsical layer (PHY) processing module is the same for these two settings. Internally, on the Tx and Rx processing chains, the unified device treats the two signals from either two frequency segments (160/80+80 MHz 1×1) or two receiver antennas (80 MHz 2×2 case) identically, except in a few specific processing steps.

According to an embodiment of the present invention, each antenna RF port is used for transmission/reception of one frequency segment for the case of the 80+80 1×1 configuration. The processing paths inside the PHY are generalized to handle two signal streams, one per channel segment or one per space-time stream.

Figure 4:
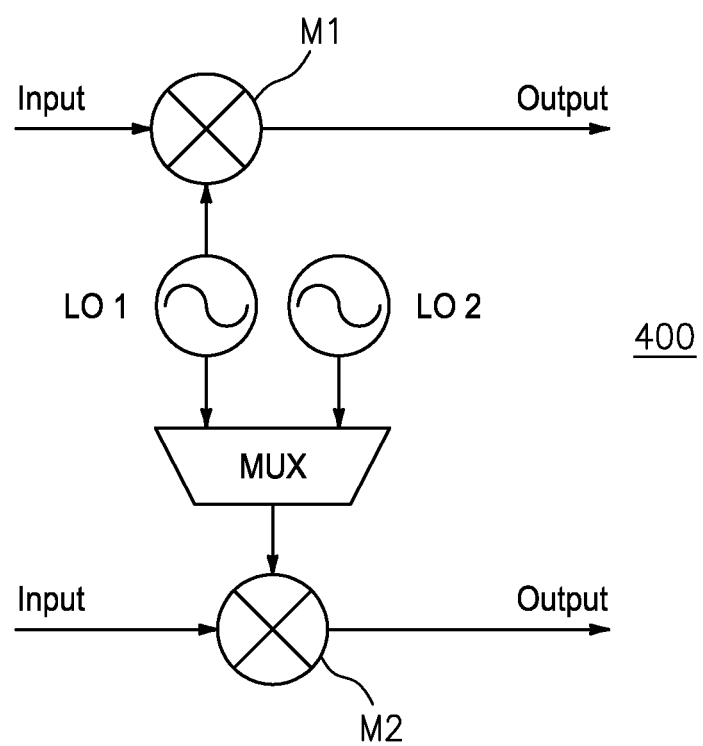
FIG. 4 illustrates an LO structure for Transmission (Tx) and Reception (Rx) chains, according to the present invention.

FIG. 4 illustrates an LO structure 400 for Tx and Rx chains, according to an embodiment of the present invention. Although the LO structure 400 illustrates a Tx chain, the same structure is used for the reverse, i.e. the Rx chain.

The LO structure 400 in FIG. 4 includes two oscillators LO1 and LO2, from which it processes signals in a selective manner. Specifically, the signal from LO1 is fed both to M1, where it is combined with the upper input stream and is output, and to a Multiplexer (MUX) where it may be selected, fed to M2 to be combined with a lower input stream and output. The signal from LO2 is also fed to the MUX, where it may be selected, fed to M2 to be combined with a lower input stream and output. Accordingly, LO1 or LO2 could be fed from the MUX to M2 and output, as selected.

Each input in FIG. 4 represents a signal from a Tx or Rx processing chain for a BCC, or a Tx or Rx processing chain for an LDPC, which will be described in detail below with respect to FIGS. 5-8.

Figure 2:
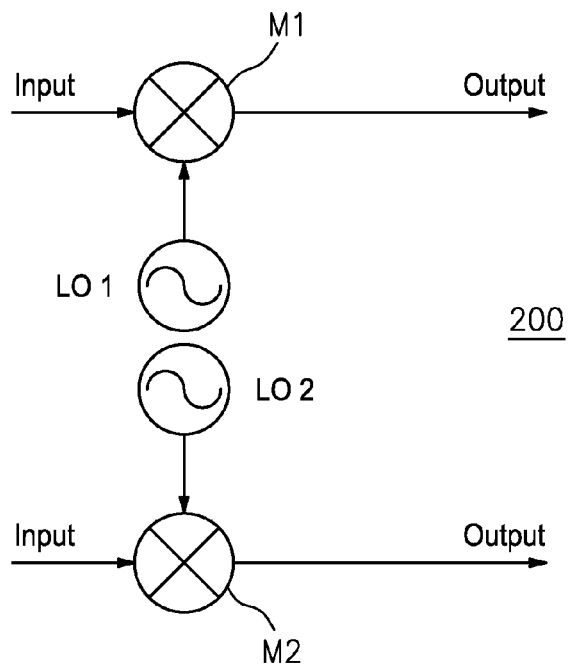
FIG. 2 illustrates a dual LO structure, according to the prior art.
Figure 3:
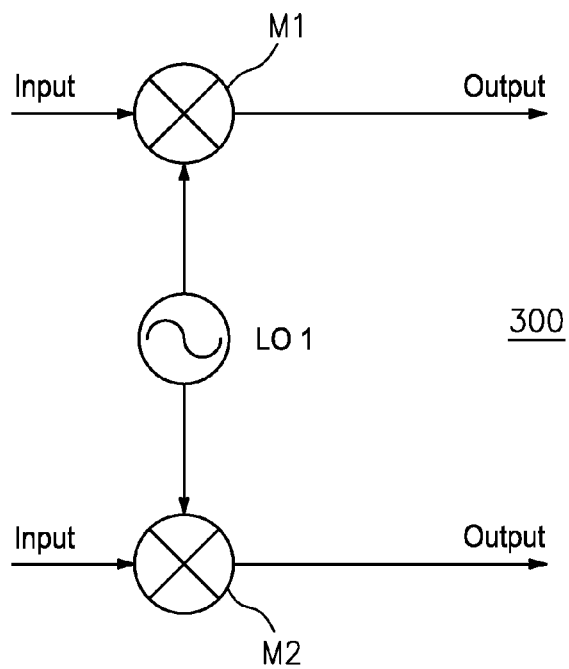
FIG. 3 illustrates a single LO structure, according to the prior art.

Unlike the prior art illustrated in FIG. 2, according to the present invention a user of the LO structure 400 in FIG. 4 can selectively switch a branch of the input between LO1 and LO2.

FIGS. 5-8 generally illustrate how the input and output RF have the same connections to the PHY layer-processing module, irrespective of the configuration selected, as the following will explain. In addition, only the encircled areas in FIGS. 5, 6 and 8 perform different processing when configured with different capabilities, according to embodiments of the present invention.

Figure 5:
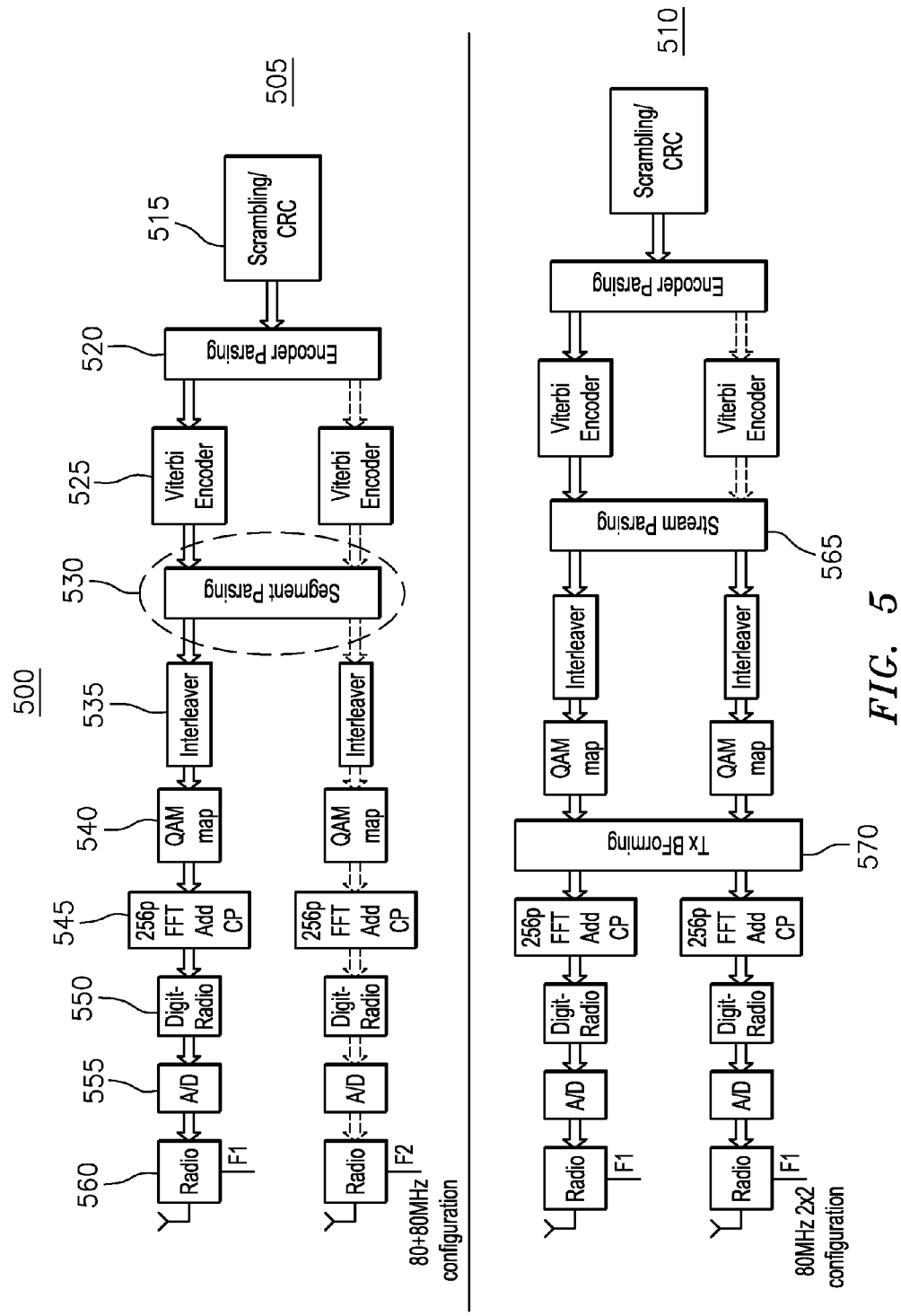
FIG. 5 illustrates Tx processing chains for a Binary Convolutional Code (BCC), according to an embodiment of the present invention.

FIG. 5 illustrates two Tx processing chains 500 for a BCC, according to an embodiment of the present invention. It is to be understood that each processing chain described heretofore is implemented in a WiFi modem chip, such as device 910 in FIG. 9 and device 1010 in FIG. 10, which will be described later herein. Such a WiFi modem chip could also be used to replace the chip 110 in the prior art structure of FIG. 1.

In FIG. 5, the Tx processing chains 500 include an 80+80 MHz 1×1 chain 505 (hereinafter 1×1) and an 80 MHz 2×2 chain 510 (hereinafter 2×2). The 1×1 chain 505 includes a scrambling/Cyclic Redundancy Check (CRC) 515, an encoder parser 520, a Viterbi encoder 525 for each of the two transceivers, a segment parser 530, an interleaver 535 (one for each transceiver), a Quadrature Amplitude Modulation (QAM) mapper 540, a 256 p Fast Fourier Transform (FFT) adder Cyclic Prefix (CP) 545, Digital Radio 550, Analog to Digital (A/D) converter 555, and Radio Frequency (RF) unit 560 for each frequency propagation of the two transceivers.

The scrambler/CRC 515 scrambles input data bits using scrambling logic, and the appropriate CRC for the scrambled data is determined to add the error correction code to the scrambled data. The bits output from the scrambler/CRC 515 are fed to an encoder parser 520, which assigns the bits to the Viterbi encoders 525 based on encoder parsing rules. The Viterbi encoders 525 correct errors of the assigned bits and encode the assigned bits to symbol data, which is fed to the segment parser 530. It is noted that the segment parser 530 is the only component in the 1×1 505 that is not reused, as indicated by encircling of the segment parser 530 in FIG. 5.

The segment parser 530 analyzes and processes the symbol data from the Viterbi encoders 525, and feeds the analyzed and processed symbol data to interleavers 535, which interleave each stream of data based on an interleaving scheme, such as a modification of the Clause 17 interleaver as set forth in the Standard. Each of the QAM mappers 540 modulates a stream of interleaved data. That is, the QAM mappers 540 modulate the bits of interleaved data based on a QAM scheme, and feed the modulated data to 256p FFT add CP 545, for fast fourier transformation of the modulated symbols into the frequency domain. The resultant symbols are digitized in digital radios 550 and A/D converters 555, and are transmitted via RF units 560 and antennas.

The design of the Tx processing chains 500 of FIG. 5 includes several of the components described in the Standard, which is incorporated herein by reference. As such, those components will not be described in further detail, for conciseness.

As mentioned above, the segment parser 530 is the only component in the 1×1 chain 505 that is not reused, as indicated by encircling of the segment parser 530 in FIG. 5. The stream parser 565 and Tx beamformer 570 are the only components in the 2×2 chain 510 that are not reused, as indicated by encircling of the stream parser 565 and Tx beamformer 570 in FIG. 5. Accordingly, each of the other components may be reused, which enhances user convenience and economy.

The 2×2 chain 510 differs from the 1×1 chain 505 in that stream parser 565 is used instead of the segment parser 530, and Tx beamformer 570 receives the signals from the QAM mappers 540, applies a selected beamforming technique and outputs the resultant signals to the FFT adder CP 545. Otherwise, the 2×2 chain 510 operates in the same manner as the 1×1 chain 505.

A key feature in FIG. 5, is that by applying the LO structure of the present invention as described in FIG. 4 to the 1×1 chains 500, the two antennas are used to target two different antenna segments. In this manner, either a 160 MHz or an 80+80 MHz frequency in existing devices having a 2×2 configuration could be implemented. In addition, the present invention teaches that either different frequencies or the same frequency can be applied to the two transceivers, based on the switching of the LO structure 400 in FIG. 4. This differs from the prior art, which does not teach a chip for applying the same or different frequencies to the two transceivers, as selected. The two different local oscillators LO1 and LO2, in the connection provided in FIG. 4, are needed for application to the two transceivers, as in FIG. 5.

Figure 6:
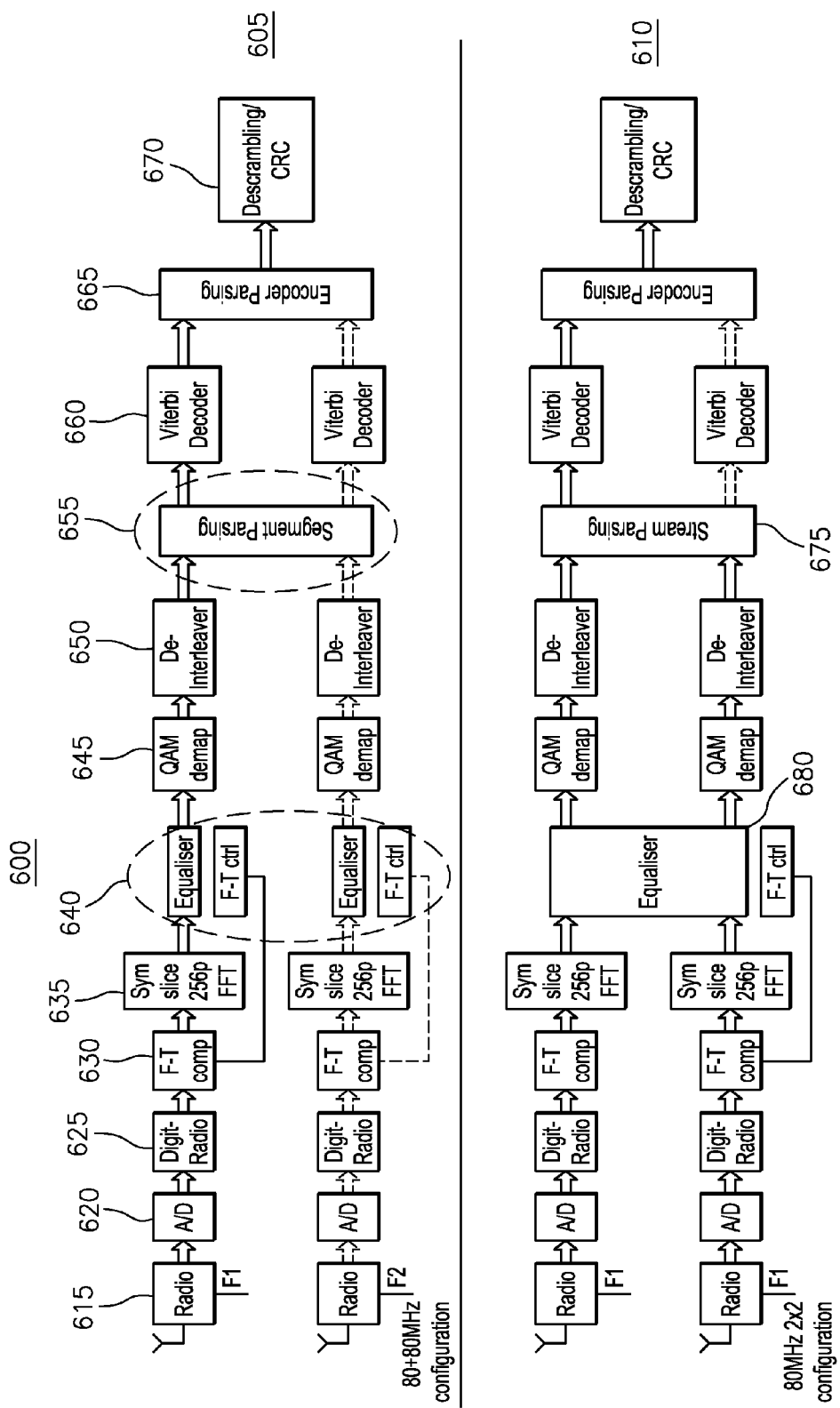
FIG. 6 illustrates Rx processing chains for a BCC, according to an embodiment of the present invention.

FIG. 6 illustrates Rx processing chains 600 for a BCC, according to an embodiment of the present invention. In FIG. 6, the inverses of the Tx signal propagations in FIG. 5 are illustrated. As such, the Rx signal propagates from the antennas to the descrambler/CRC 670.

In particular, the Rx processing chains 600 include a 1×1 chain 605 having an RF unit 615, an A/D converter 620, a digitizer 625, an F-T comp 630, a symbol slice 256p FFT 635, an Equalizer 640 including F-T control, a QAM demapper 645, a de-interleaver 650, segment parser 655, Viterbi decoder 660, encoder parser 665 and the descrambler/CRC 670, for each frequency propagation of the two transceivers.

The 2×2 chain 610 differs from the 1×1 chain 605 in that a stream parser 675 is used instead of the segment parser 655, and a single Equalizer and F-T control 680 is used instead of the two Equalizer and F-T control units 640. Otherwise, the 2×2 chain 610 operates in the same manner as the 1×1 chain 605. It is noted that the Equalizers 640 and the segment parser 655 are the only components in the 1×1 605 that are not reused, as indicated by encircling of the Equalizers 640 and the segment parser 655 in FIG. 6. In addition, the stream parser 675 and Equalizer 680 are the only components in the 2×2 chain 610 that are not reused.

The design of the Rx processing chains 600 of FIG. 6 includes several of the components described in the Standard, which is incorporated herein by reference. As such, those components will not be described in detail, for conciseness. A key difference, however, between the Standard and FIG. 6, is that by applying the LO structure of the present invention as described in FIG. 4 to the 2×2 chains 600, the two antennas are used to target two different antenna segments. In this manner, either a 160 MHz or an 80+80 MHz frequency in existing devices having a 2×2 configuration could be implemented. In addition, the present invention teaches that either different frequencies or the same frequency can be applied to the two transceivers, based on the switching of the LO structure 400 in FIG. 4. This differs from the prior art, which does not teach a chip for applying the same or different frequencies to the two transceivers, as selected. The two different local oscillators LO1 and LO2, in the connection provided in FIG. 4, are needed for application to the two transceivers, as in FIG. 6.

Figure 7:
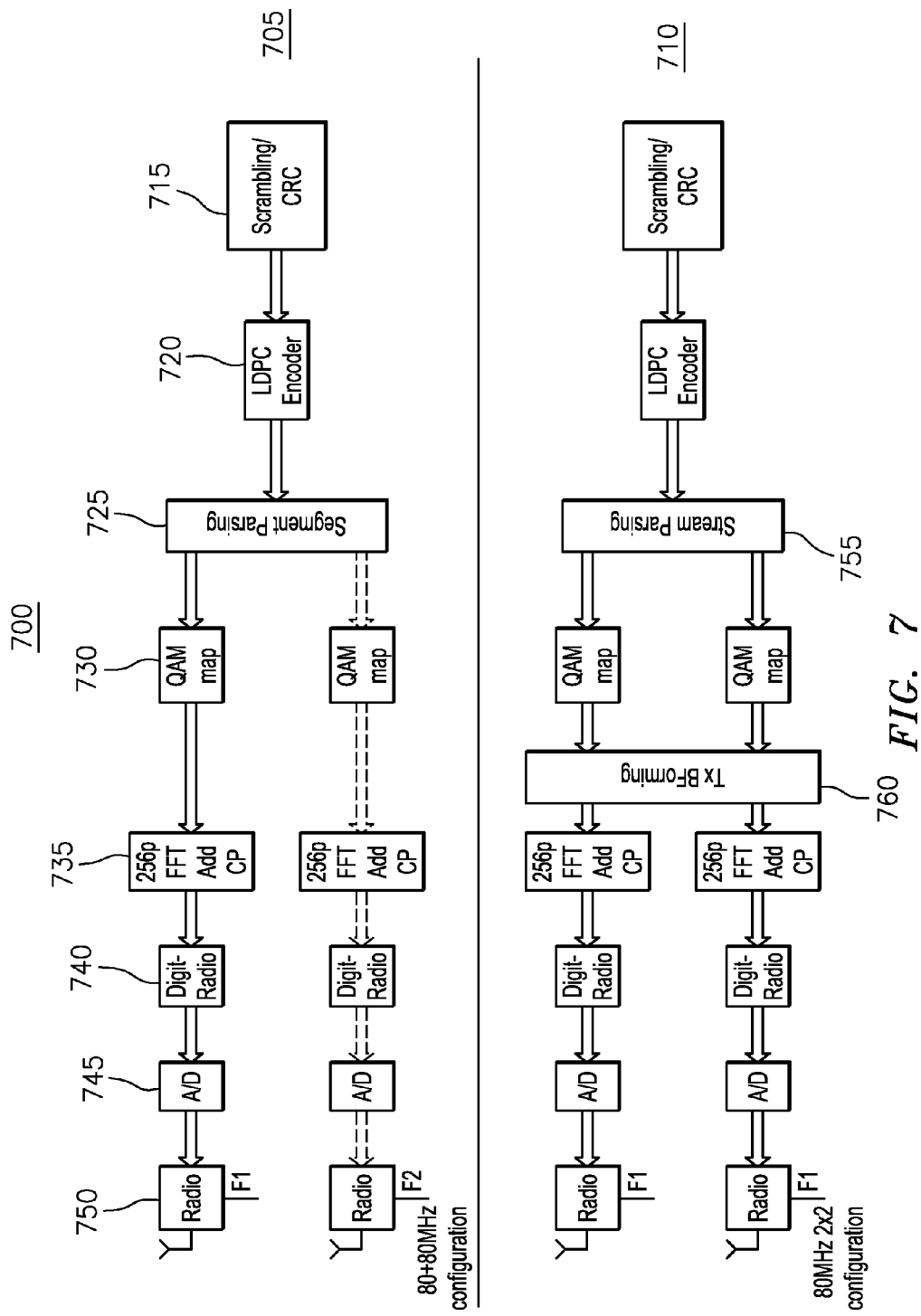
FIG. 7 illustrates Tx processing chains for a Low Density Parity Code (LDPC), according to an embodiment of the present invention.

FIG. 7 illustrates Tx processing chains 700 for a Low Density Parity Code (LDPC), according to an embodiment of the present invention. In FIG. 7, the Tx processing chains 700 include a 1×1 chain 705 and a 2×2 chain 710. The 1×1 chain 705 includes a scrambling/CRC 715, a Low Density Parity Check (LDPC) encoder 720, a segment parser 725, and a QAM mapper 730, a 256 p FFT adder CP 735, Ditigizer 740, A/D converter 745, and RF unit 750 for for each frequency propagation of the two transceivers.

The 2×2 chain 710 differs from the 1×1 chain 705 in that a stream parser 755 is used instead of the segment parser 725, and a Tx beamformer 760 receives the signals from the QAM mappers, applies a selected beamforming technique and outputs the resultant signals to the FFT adder CP, whereas the 1×1 chain 705 does not include Tx beamforming.

The embodiment of FIG. 7 operates in a similar manner as FIG. 5, except a different variance of Forward Error Correction (FEC) coding is used. Specifically, the embodiment of FIG. 7 implements an LDPC encoder 720 to encode the bits output from the scrambler/CRC 715, instead of the encoder parser 520 and Viterbi encoders 525 of FIG. 5. In addition, the embodiment of FIG. 7 does not implement the interleavers 535 of FIG. 5.

It is noted that although the embodiments of FIGS. 5 and 7 are separately illustrated, both embodiments are implemented on the WiFi modem chip of the present invention. In other words, the WiFi modem chip includes both the Viterbi encoder and LDPC encoder options for FEC.

Figure 8:
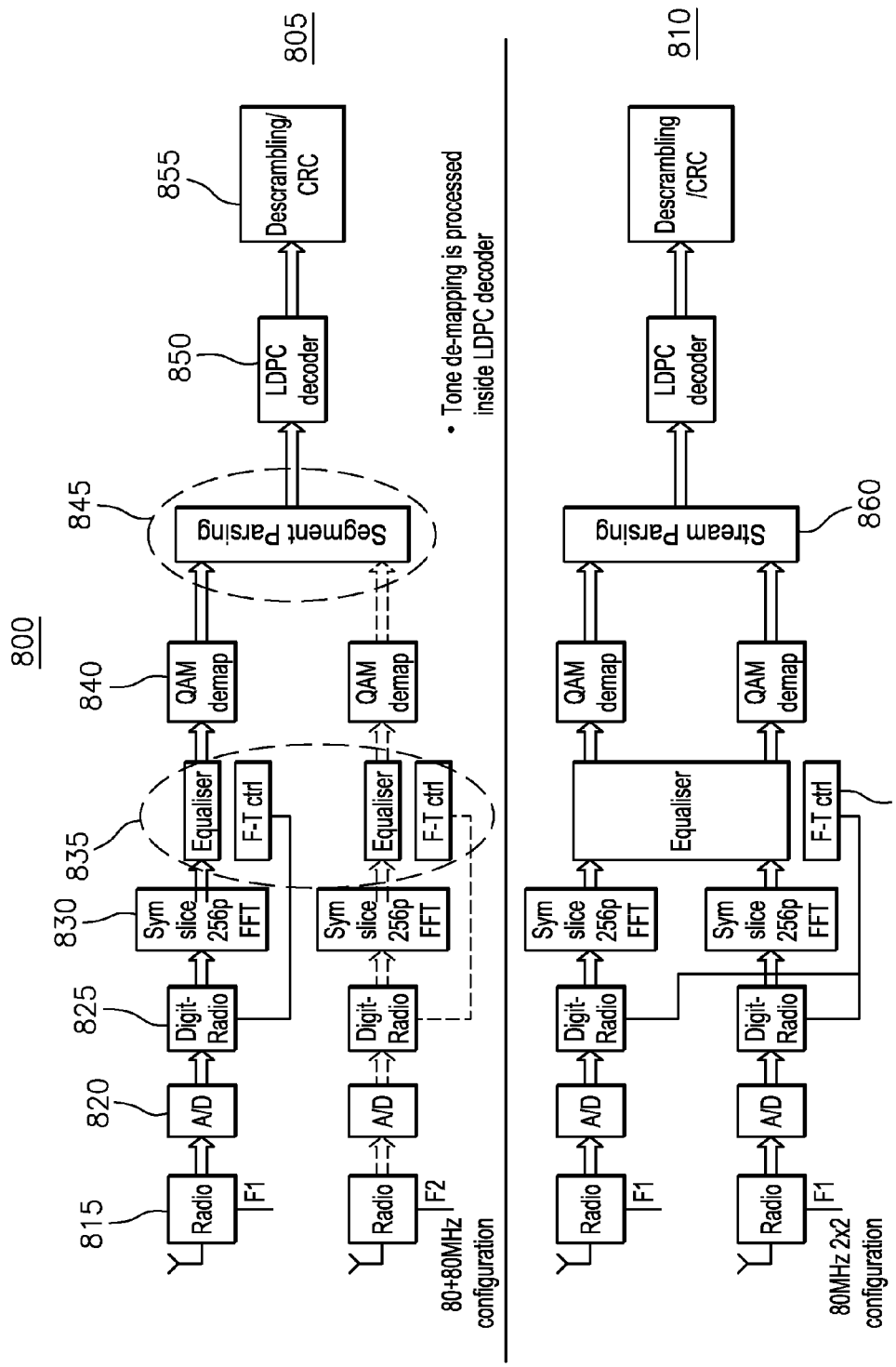
FIG. 8 illustrates Rx processing chains for an LDPC, according to an embodiment of the present invention.

FIG. 8 illustrates Rx processing chains for an LDPC, according to an embodiment of the present invention. In FIG. 8, the inverses of the Tx signal propagations in FIG. 7 are illustrated. As such, the Rx signal propagates from the antennas to the descrambler/CRC 855.

In particular, the Rx processing chains 800 include a 1×1 chain 805 having an RF unit 815, an A/D converter 820, a Digitizer 825, symbol slice 256 p FFT 830, an Equalizer including F-T control 835, a QAM demapper 840, a segment parser 845, an LDPC decoder 850, and the descrambler/CRC 855, for each frequency propagation of the two transceivers.

The 2×2 chain 810 differs from the 1×1 chain 805 in that a stream parser 860 is used instead of the segment parser 845, and a single Equalizer and F-T control 865 is used instead of the two Equalizer and F-T control units 835. Otherwise, the 2×2 chain 810 operates in the same manner as the 1×1 chain 805. It is noted that the Equalizers 835 and the segment parser 845 are the only components in the 1×1 chain 805 that are not reused, as indicated by encircling of the Equalizers 835 and the segment parser 845 in FIG. 8. In addition, the stream parser 860 and Equalizer 865 are the only components in the 2×2 chain 810 that are not reused.

The embodiment of FIG. 8 operates in a similar manner as that of FIG. 6, except a different variance of FEC coding is used. Specifically, the embodiment of FIG. 8 implements an LDPC decoder 850 to decode the bits output to the descrambler/CRC 855, instead of the encoder parser 665 and Viterbi decoders 660 of FIG. 6. In addition, the embodiment of FIG. 8 does not implement the de-interleavers 650 of FIG. 6.

It is noted that although the embodiments of FIGS. 6 and 8 are separately illustrated, both embodiments are implemented on the WiFi modem chip. In other words, the WiFi modem chip includes both the Viterbi decoder and LDPC decoder options for FEC.

Figure 9:
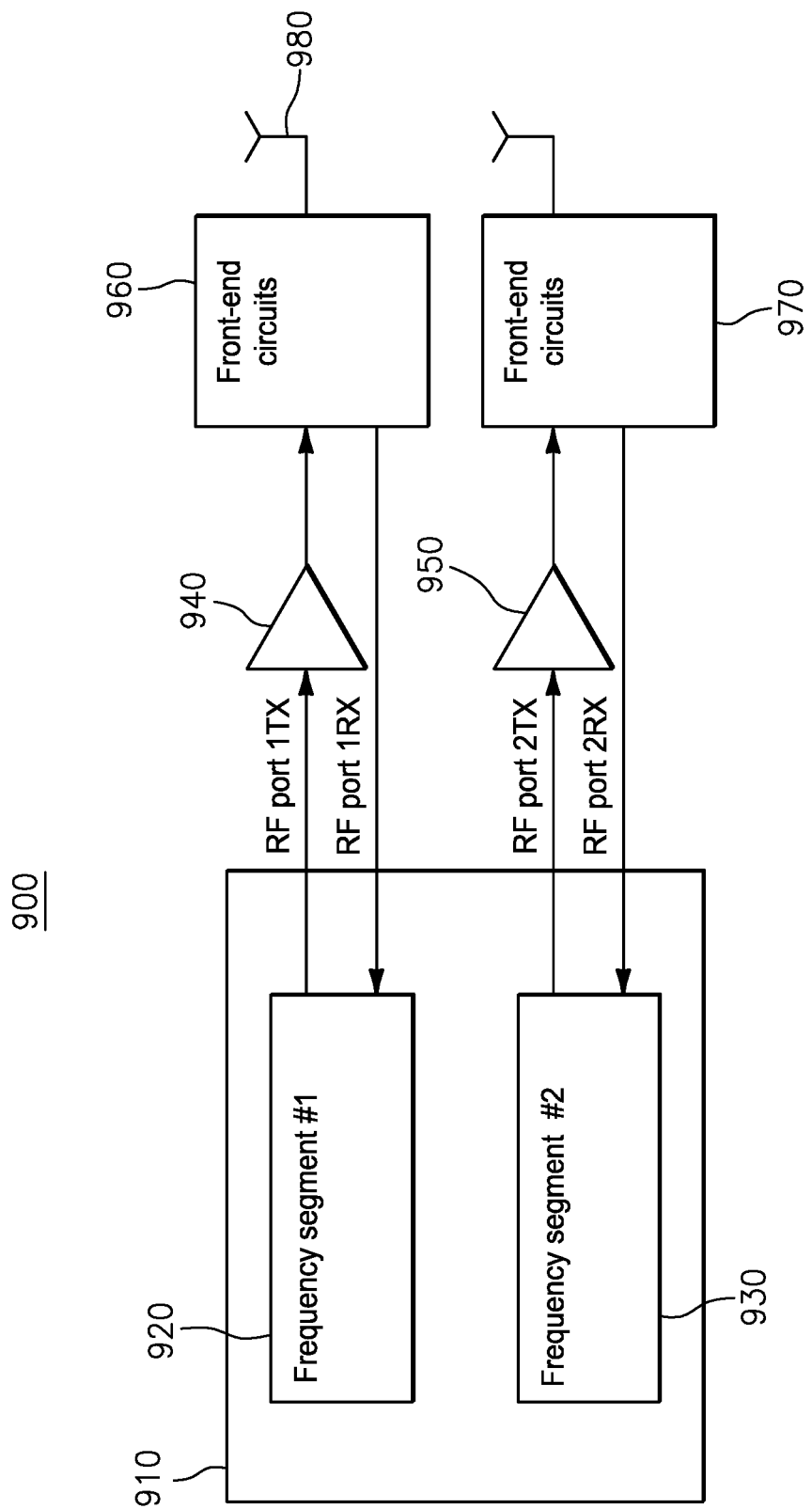
FIG. 9 illustrates a 2-antenna device operating in 80+80 MHz 1×1 configuration, according to an embodiment of the present invention.
Figure 10:
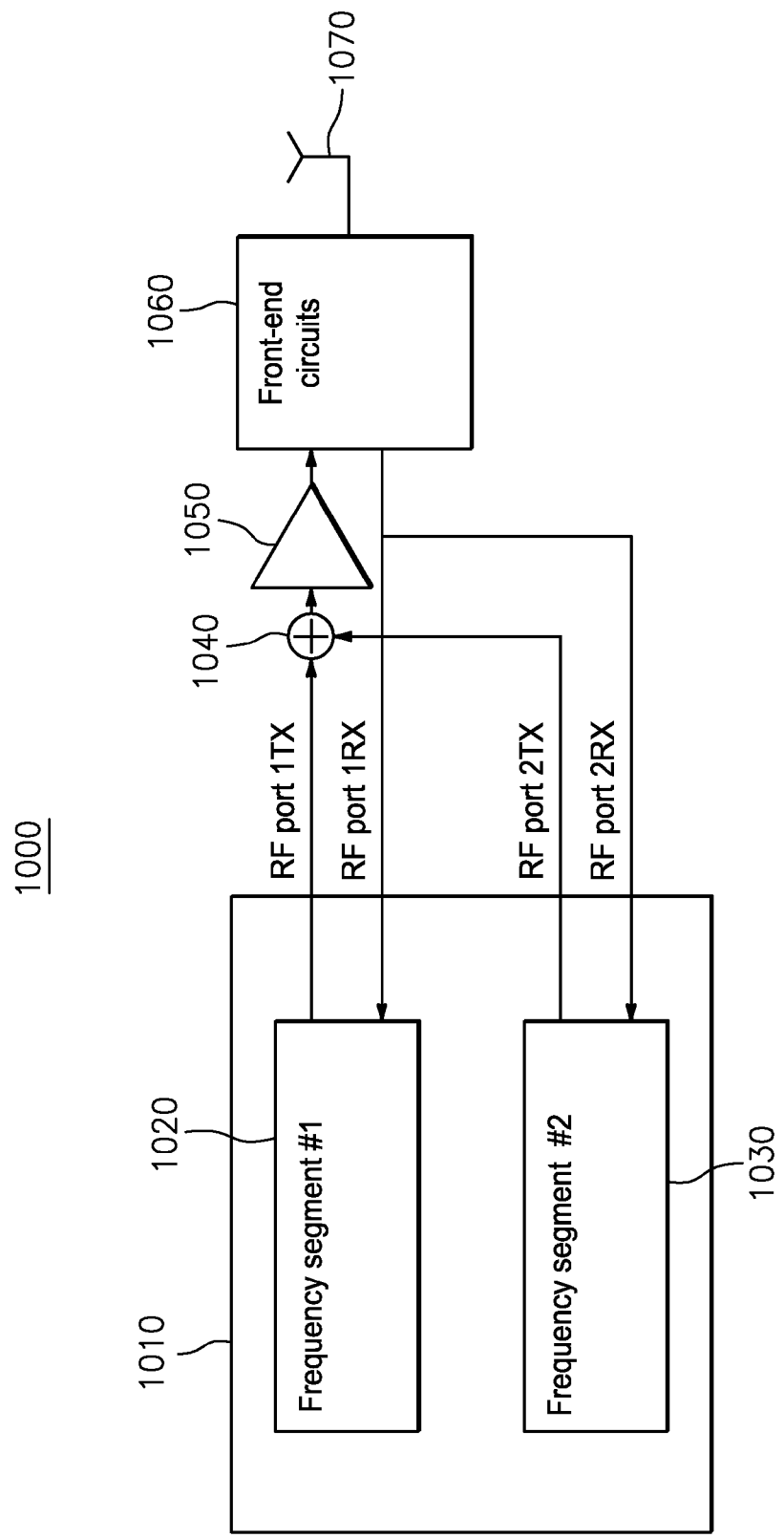
FIG. 10 illustrates a 1-antenna device operating in 80+80 MHz 1×1 configuration, according to an embodiment of the present invention.

FIGS. 9 and 10 illustrate how the same device can be used either as a 2×2 MIMO device or a 1×1 device with 80+80 MHz capability, by rearranging external components, as the following will explain.

FIG. 9 illustrates a 2-antenna device operating in 80+80 MHz 1×1 configuration, according to an embodiment of the present invention.

In FIG. 9, the structure 900 includes a WiFi modem chip 910 incorporating a frequency segment #1 920 and a frequency segment #2 930 connected to two front-end circuits 960 and 970, respectively, through respective buffers 940 and 950. As the operation of the buffers and front-end circuits, as well as their connections have been described in FIG. 1, the details will be omitted here.

FIG. 9 differs from the prior art with respect to the Wi-Fi modem chip 910. Here, two frequency segments are implemented in a two-antenna configuration. In addition, although not shown in detail in FIG. 9, the LO structure of FIG. 4 is implemented in each frequency segment 920, 930. As such, there are two local oscillators LO1 and LO2 in each frequency segment, and the signal from the same channel (e.g., LO1 as in FIG. 4) or from two different channels LO1 and LO2 could be selectively used.

Figure 1:
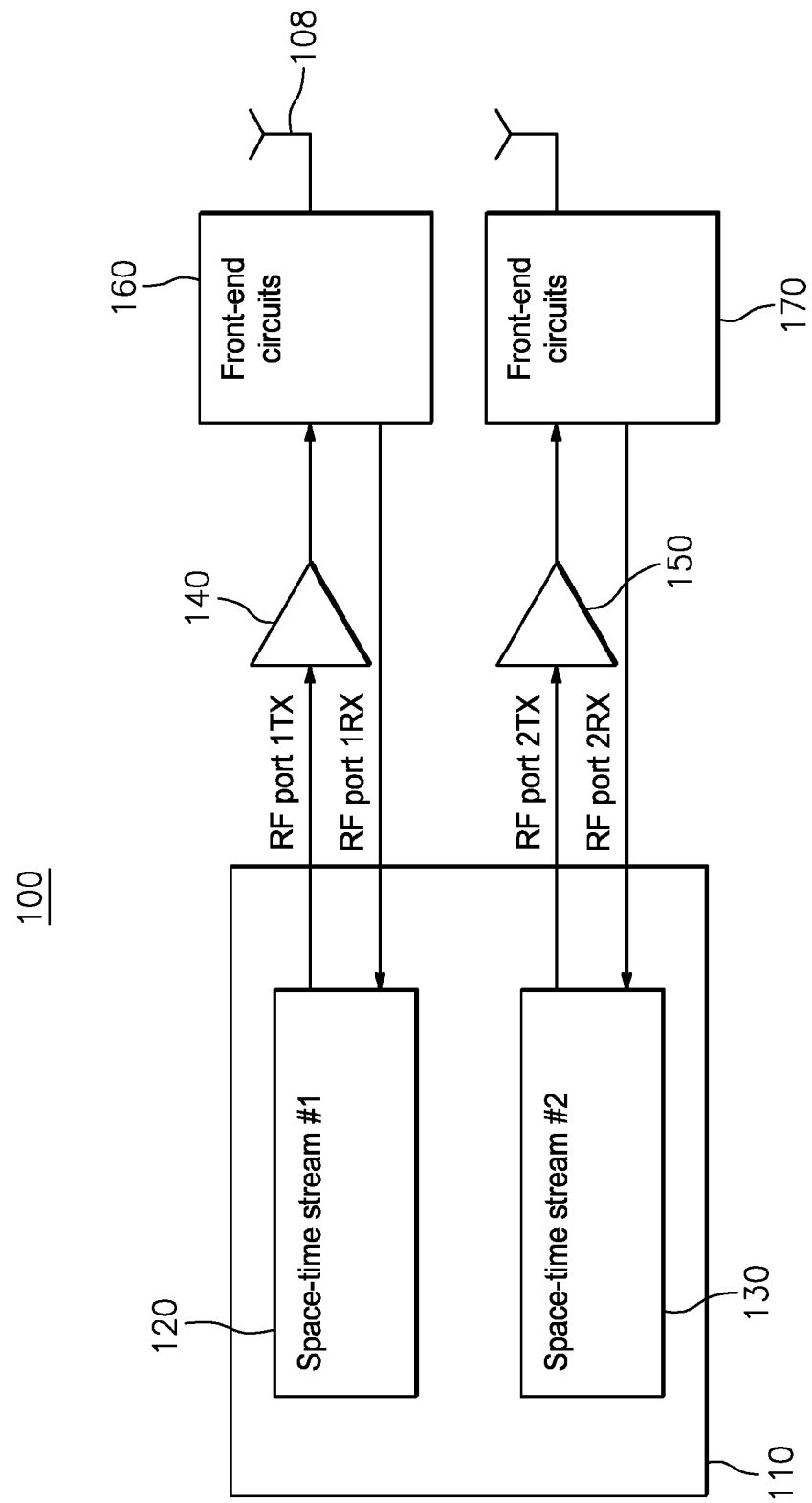
FIG. 1 illustrates a 2-antenna device operating in a MIMO 2×2 configuration, according to the prior art.

It is to be understood that FIG. 9 corresponds to the merging of 1×1 505 in FIG. 5 and 1×1 605 in FIG. 6, for example, as FIG. 9 includes Tx and Rx configured for two-antenna devices.

FIG. 10 illustrates a 1-antenna device operating in 80+80 MHz 1×1 configuration, according to an embodiment of the present invention.

In FIG. 10, the structure 1000 includes a WiFi modem chip 1010 incorporating a frequency segment #1 1020 and a frequency segment #2 1030 connected to one front-end circuit 1060, in part through a power amplifier 1050. Specifically, for each frequency segment, a Tx RF port enters an adder 1040, the output of which enters the power amplifier 1050 and exits to the front-end circuit, and an Rx RF port is received directly from the front-end circuit, which is connected to a single antenna 1070.

Although the WiFi modem chip of the present invention has the capability of operating both as a 2×2 80 MHz device or a single-antenna, 1×1 160 MHz or 80+80 MHz device, this does not preclude the use of the WiFi modem chip of the present invention combined with a single, front-end antenna for the 80+80 MHz device.

Accordingly, FIG. 10 is embodied such that a user who may not have the physical space in their mobile terminal for two antennas, may use this WiFi modem chip of the embodiment of FIG. 10 in the user's single-antenna mobile terminal.

Thus, the embodiment of FIG. 10 illustrates that the combination of the two segments on Tx and splitting them on Rx can also be performed on-chip. Although two local oscillators are required to support 80+80 MHz configuration, in embodiments of the present invention for MIMO 2×2, the two antenna signals may be frequency-converted using either a single (common) local oscillator, or two oscillators locked to the same reference, one for each antenna signal.

As can be seen from the foregoing description and attached drawings, when the device is used in a 2-antenna configuration, either one frequency segment or one space-time-stream per antenna port is transmitted. The device can also be used in a single antenna configuration, in which case the two RF outputs are added together before connection to the antenna, and the two RF inputs are fed by the same antenna.

As can be seen from the foregoing description and attached drawings, a single chip can be re-configured to support one of the two frequency capabilities, which enhances user convenience and economy. In addition, a unified chip device avoids code divergence and reduces maintenance cost.

Furthermore, the reconfigurability of embodiments of the present invention provides the same maximum data rate for MIMO 2×2 80 MHz and 80+80 1×1, at 866.7 Mbps. Therefore, the required capacity of data paths in the Medium Access Control layer and the throughput of the host interface are the same for the two configurations. In addition, the digital and analog processing of the RF port signals are the same for the two configurations, as in both cases the processing chains carry Orthogonal Frequency Division Multiplexing signals with up to an 80 MHz bandwidth.

Operation with 160 MHz channel bandwidth is supported as a special case of 80+80 MHz operation, where the two 80 MHz frequency segments are adjacent.

The embodiments of the present invention can also be embodied as computer-readable codes on a computer-readable recording medium. The computer-readable recording medium is any data storage device that can store data that can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices. The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the present invention has been particularly shown and described with reference to certain embodiments thereof, it will be understood by those of ordinary skill in the art that various changes in form and details may be made therein without departing from the spirit and scope of the present invention.

What is claimed is:

1. A device for transmitting signals wirelessly, comprising:
   at least one antenna;
   two local oscillators electrically connected to the at least one antenna;
   a multiplexer configured to electrically connect either of the local oscillators to a second mixer, based on switching;
   a first mixer electrically connected to a fixed one of the two local oscillators and configured to receive and output signal of the fixed one of the two local oscillators, without the switching; and
   the second mixer electrically connected to the multiplexer.

2. The device of claim 1, wherein an operating frequency for each of the two local oscillators is 80 Megahertz.

3. The device of claim 1, wherein the second mixer is configured to combine an output from the multiplexer with an input from a frequency segment of a transmission chain of a Binary Convolutional Code (BCC) encoder.

4. The device of claim 1, wherein the device is adapted to be operable in a single antenna mobile terminal.

5. The device of claim 3, wherein the second mixer is configured to combine an output from the multiplexer with an input from a frequency segment of a transmission chain of a Low Density Parity Check (LDPC) encoder.

6. A device for receiving signals wirelessly, comprising:
at least one antenna;
two local oscillators electrically connected to the at least one antenna;
a multiplexer configured to electrically connect either of the local oscillators to a second mixer, based on switching;
a first mixer electrically connected to a fixed one of the two local oscillators and configured to receive an output signal of the fixed one of the two local oscillators, without the switching; and
the second mixer electrically connected to the multiplexer.

7. The device of claim 6, wherein an operating frequency for each of the two local oscillators is 80 Megahertz.

8. The device of claim 6, wherein the second mixer is configured to combine an output from the multiplexer with an input from a frequency segment of a reception chain of a Binary Convolutional Code (BCC) encoder.

9. The device of claim 6, wherein the device is adapted to be operable in a single antenna mobile terminal.

10. The device of claim 8, wherein the second mixer is configured to combine an output from the multiplexer with an input from a frequency segment of a reception chain of a Low Density Parity Check (LDPC) encoder.

11. A method for transmitting signals wirelessly, comprising:
generating frequency signals, by two local oscillators electrically connected to at least one antenna;
receiving, by a multiplexer configured to electrically connect either of the local oscillators to a second mixer based on switching, the frequency signals from a selected one of the local oscillators;
electrically connecting a fixed one of the two local oscillators to a first mixer and providing the first mixer with an output signal of the fixed one of the two local oscillators, without the switching; and
electrically connecting the second mixer to the multiplexer.

12. The method of claim 11, further comprising:
operating each of the two local oscillators at a frequency of 80 Megahertz.

13. The method of claim 11, further comprising:
combining, by the second mixer, an output from the multiplexer with an input from a frequency segment of a transmission chain of a Binary Convolutional Code (BCC) encoder.

14. The method of claim 11, further comprising:
combining, by the second mixer, an output from the multiplexer with an input from a frequency segment of a transmission chain of a Low Density Parity Check (LDPC) encoder.

15. The method of claim 11, wherein the method is operable in a single antenna mobile terminal.

16. A method for receiving signals wirelessly, comprising:
generating frequency signals, by two local oscillators electrically connected to at least one antenna;
transmitting, by a multiplexer configured to electrically connect either of the local oscillators to a second mixer based on switching, the frequency signals from a selected one of the local oscillators;
electrically connecting a fixed one of the two local oscillators to a first mixer and providing the first mixer with an output signal of the fixed one of the two local oscillators, without the switching; and
electrically connecting the second mixer to the multiplexer.

17. The method of claim 16, further comprising:
operating each of the two local oscillators at a frequency of 80 Megahertz.

18. The method of claim 16, further comprising:
combining, by the second mixer, an output from the multiplexer with an input from a frequency segment of a reception chain of a Binary Convolutional Code (BCC) encoder.

19. The method of claim 16, further comprising:
combining, by the second mixer, an output from the multiplexer with an input from a frequency segment of a reception chain of a Low Density Parity Check (LDPC) encoder.

20. The method of claim 16, wherein the method is operable in a single antenna mobile terminal.

* * * * *